(12) United States Patent
Kamenetz et al.

(10) Patent No.: US 10,711,916 B2
(45) Date of Patent: Jul. 14, 2020

(54) AIRCRAFT ENVIRONMENTAL CONTROL SYSTEM INCLUDING VALVE BUILT-IN-TEST WITHOUT POSITION FEEDBACK

(71) Applicant: HAMILTON SUNDSTRAND CORPORATION, Charlotte, NC (US)

(72) Inventors: Jeffry K. Kamenetz, Windsor, CT (US); James Joyce, Bristol, CT (US); Erin G. Kline, Vernon, CT (US); John M. Maljanian, Farmington, CT (US); Jay H. Hartman, Willington, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 310 days.

(21) Appl. No.: 15/927,471

(22) Filed: Mar. 21, 2018

(65) Prior Publication Data
US 2019/0293204 A1 Sep. 26, 2019

(51) Int. Cl.
*F16K 37/00* (2006.01)
*B64D 13/04* (2006.01)
*B64F 5/60* (2017.01)
*B64D 13/08* (2006.01)
*B64D 45/00* (2006.01)
*B64D 13/06* (2006.01)

(52) U.S. Cl.
CPC .......... *F16K 37/0041* (2013.01); *B64D 13/04* (2013.01); *B64D 13/06* (2013.01); *B64D 13/08* (2013.01); *B64D 45/00* (2013.01); *B64F 5/60* (2017.01); *B64D 2013/0618* (2013.01); *B64D 2045/0085* (2013.01)

(58) Field of Classification Search
CPC ........................ B64D 2013/0618; B64D 13/04
See application file for complete search history.

(56) References Cited

U.S. PATENT DOCUMENTS 922,851 A 5/1909 Burr et al.
7,328,098 B1 2/2008 Vanderleest et al.
(Continued)

FOREIGN PATENT DOCUMENTS

IE 102014106685 A1 11/2014

OTHER PUBLICATIONS

Search Report for European Application No. 19164324.6; Application Filing Date Mar. 21, 2019; dated Jul. 9, 2019 (7 pages).

*Primary Examiner* — Matthew G Marini
(74) *Attorney, Agent, or Firm* — Cantor Colburn LLP

(57) ABSTRACT

An aircraft environmental control system (ECS) includes a first valve that is adjustable between a plurality of first positions to open or shut-off a bleed air flow that flows from an inlet of the first valve to an outlet of the first valve. A second valve includes an inlet in fluid communication with the first valve outlet, and is adjustable between a plurality of second positions to throttle the bleed air that flows from the inlet of the second valve to an outlet of the second valve. A valve position sensor outputs a position signal indicating a measured position among the plurality of second positions. A controller is in signal communication with the valve position sensor. The controller is configured to determine a primary effective area of the second valve based on the measured position, and to diagnose operation of the first valve based on the primary effective area.

15 Claims, 2 Drawing Sheets

(56) References Cited

U.S. PATENT DOCUMENTS

| | | |
|---|---|---|
| 9,228,512 B2 | 1/2016 | Chen et al. |
| 9,555,903 B2 | 1/2017 | Howard |
| 9,784,638 B1 | 10/2017 | Followell et al. |
| 2006/0212140 A1* | 9/2006 | Brackney .............. F02D 11/105 700/29 |
| 2016/0160781 A1* | 6/2016 | Nagar ..................... F02B 25/08 701/102 |
| 2017/0166328 A1 | 6/2017 | Ethington et al. |
| 2017/0175586 A1 | 6/2017 | Tricaud et al. |
| 2017/0321570 A1 | 11/2017 | Scothern |
| 2018/0065752 A1 | 3/2018 | Franco et al. |

\* cited by examiner

AIRCRAFT ENVIRONMENTAL CONTROL SYSTEM INCLUDING VALVE BUILT-IN-TEST WITHOUT POSITION FEEDBACK

BACKGROUND

Exemplary embodiments pertain to the aircraft systems, and more specifically, to aircraft environmental control systems.

An aircraft environmental control system (ECS) typically employ one or more various valves to direct bleed air to one or more air cycle machines (ACMs) such as, for example, a pneumatic air cycle kit (PACK). The PACK then supplies heated or cooled air conditioning to the passengers and flight crew. One or more of the valves may be located in adverse environments such as a hot, high vibration, dirt-contaminated environment. One example of an adverse environment found on aircrafts is the engine compartment. Valves located in these adverse environments, however, are precluded from implementing a feedback sensor and/or valve position sensors (e.g., rotary variable transformers, potentiometers, position limit switches, etc.).

BRIEF DESCRIPTION

According to a non-limiting embodiment, an aircraft environmental control system (ECS) includes a first valve that is adjustable between a plurality of first positions to open or shut-off a bleed air flow that flows from an inlet of the first valve to an outlet of the first valve. A second valve includes an inlet in fluid communication with the first valve outlet, and is adjustable between a plurality of second positions to throttle the bleed air that flows from the inlet of the second valve to an outlet of the second valve. A valve position sensor outputs a position signal indicating a measured position among the plurality of second positions. A controller is in signal communication with the valve position sensor. The controller is configured to determine a primary effective area of the second valve based on the measured position, and to diagnose operation of the first valve based on the primary effective area.

According to another non-limiting embodiment, a method of diagnosing a valve included in an environment control system (ECS) of an aircraft is provided. The method comprises supplying bleed air flow to a first valve that is adjustable between a plurality of first positions to open or shut-off the bleed air flow flowing from an inlet of the first valve to an outlet of the first valve. The method further includes outputting, via a valve position sensor, a position signal indicating a measured position of a second valve including an inlet of the second valve in fluid communication with the outlet of the first valve. The second valve is adjustable between a plurality of second positions to throttle the bleed air that flows from the inlet of the second valve to a second outlet of the second valve. The method further includes determining, via an electronic hardware controller, a primary effective area of the second valve based on the measured position, and diagnosing, via the controller, an operation of the first valve based on the primary effective area.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

In many applications, the presence of a dormant faulty valve can cause performance issues with an ECS until maintenance can be performed. Therefore, although a valve may be located in an environment that precludes the inclusion of valve position sensor or feedback sensor, the position of the valve is still beneficial as it can be utilized to diagnose the valve's health and operating status.

Various non-limiting embodiments described herein provide an ECS that includes a valve built-in-test (BIT) without requiring a valve positional feedback or additional valve position sensors. In at least one example, the positional feedback of a valve located in a non-adverse environment (e.g., located remotely from the engine compartment) is used to diagnose another valve that excludes positional feedback or an implemented position feedback sensor. In this manner, a valve located in an adverse environment (e.g., the engine compartment) can still be diagnosed.

Figure 1:
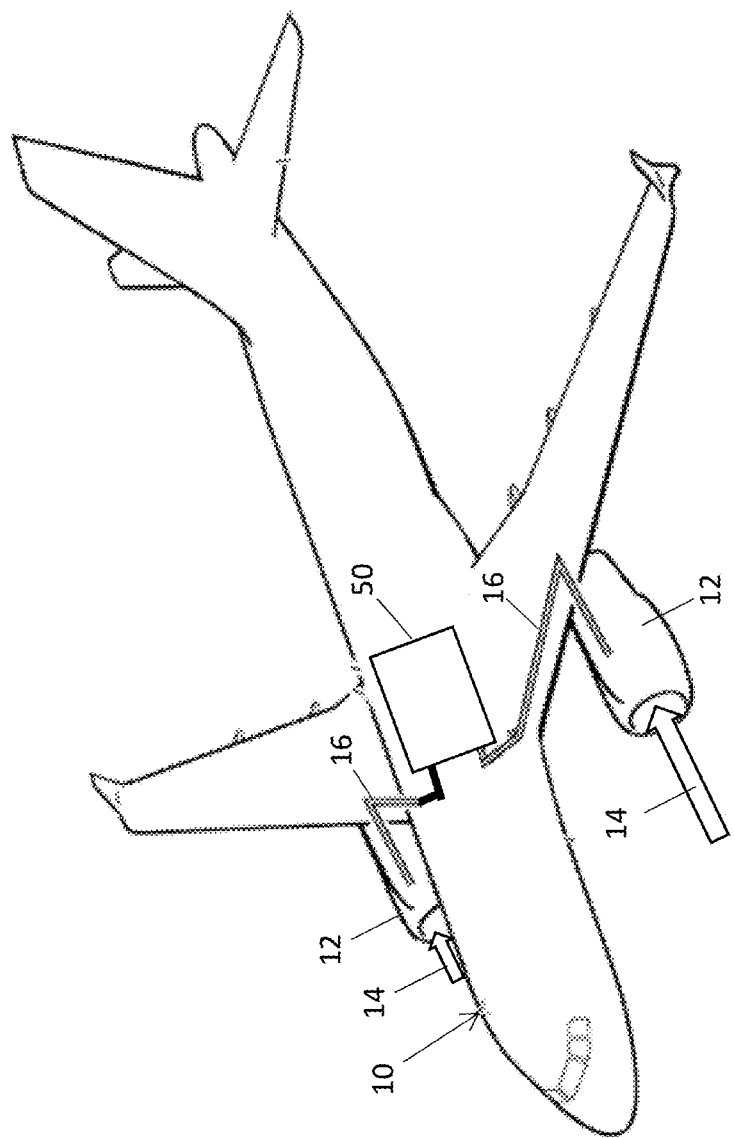
FIG. 1 is diagram of an aircraft including an environmental control system (ECS) according to a non-limiting embodiment.

With reference now to FIG. 1, an aircraft 10 including an environmental control system (ECS) 50 is illustrated according to a non-limiting embodiment. The aircraft 10 includes one or more engines 12. The engines 12 intake air 14, which is compressed in a compressor (not shown). The compressed air is mixed with a fuel burning system (not shown) to generate thrust.

A portion of the intake air, typically referred to as bleed air, is diverted to the ECS 50 via one or more bleed air paths 16. In general, the ECS 50 aims to perform air conditioning, while also assisting in cabin pressurization, ECS 50 includes a bleed air system (not shown in FIG. 1), which utilizes the bleed air (e.g., high-pressure bleed air and low-pressure bleed air) to control temperatures of various areas of the aircraft 10 such as the cabin, flight decks, cargo compartments and avionics.

Figure 2:
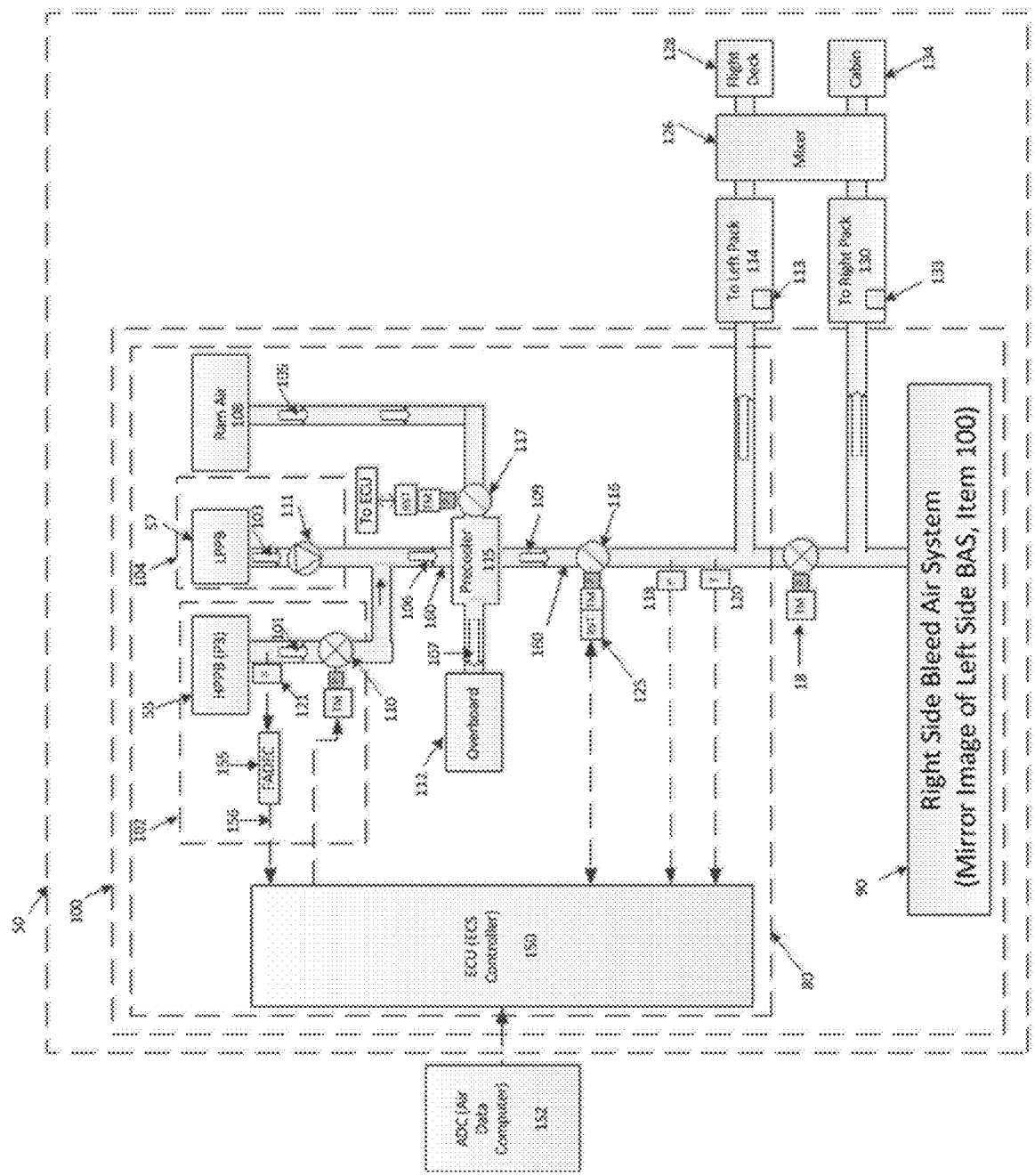
FIG. 2 is a diagram of left and right portions of a bleed air system included in an aircraft ECS according to a non-limiting embodiment.

Turning now to FIG. 2, an airflow network 100 included in an ECS 50 is illustrated according to a non-limiting embodiment. The airflow system 100 includes a left portion 80 which can receive bleed air from a left engine 12 and a right portion 90 which can receive bleed air from a right engine 12. The left and right portions have mirrored components and operate similar to one another. For the sake of brevity, therefore, the airflow system 100 will be described in terms of the left portion 80 with the understanding the descriptions of the left portion 80 can be applied to the right portion 90.

Each engine has two sources of bleed air: HPPB 55 (High-Pressure Port Bleed) and LPPB 57 (Low Pressure Port Bleed). When the engine 12 is at high power settings, the LPPB provides adequate pressure to provide pneumatic air for the ECS 50. If the engine 12 is at low power, the LPPB pressures are inadequate and the ECS Controller 150 will open HPSOV 110 to provide higher pressure air from the HPPB. For engine fuel economy and engine life reasons, it is preferred that the LPPB 57 be used instead of the HPPB 55.

The air system 100 includes an ECS controller 150 in signal communication with an electronic air data computer (ADC) 152. The ECS controller 150 is configured to control various valves included in the left portion 80. The ADC 152 can operate to determine (e.g., calculate) ambient pressure (Pamb) and/or ambient temperature (Tamb) values.

The ECS controller 150 is also in signal communication with an engine controller 155 to receive additional measurements associated with the aircraft and/or engine (e.g., pressure measurements, temperature measurements, etc.). For example, the engine controller 155 can receive pressure readings from the HPPB pressure sensor 121, and perform additional calculations to determine the pressure at the inlet of the high-pressure bleed air shutoff valve (HPSOV) 110. The determined inlet pressure value 156 can then be delivered from the engine controller 155 to the ECS controller 150. In at least one embodiment, data between the ECS controller 150 and the engine controller is exchanged over a digital communication bus such as, for example, an ARINC-429 serial data bus.

The air system can also include a cross-bleed valve 18, which controls the supply of pre-cooled source air 109 to the left and right PACKs 114 and 130. The cross-bleed valve 18 can be adjusted at any time (e.g., by a control signal) to control the pre-cooled source air 109 delivered to the left PACK 114 and the right PACK 130. In this manner, the air system 100 can operate according to different modes as described in greater detail below.

The left and right PACKs 114 and 130 are installed as separate and independent components. Each PACK 114 and 130 operates as an air cycle machine (ACM) which converts the pre-cooled air 109 into temperature-regulated air. The PACKS 114 and 130 are also capable of measuring and controlling the mass flow of air. For instance the left PACK 114 includes a left mass air flow (MAF) sensor 113 while the right PACK 130 includes a right MAF 133. Air output from the left and right PACKs 114 and 130, respectively, is delivered to a mixing and distribution unit 126 which can operate to mix air output from the PACKs 114 and 130, with cabin air and/or flight deck air. The mixed air can also be delivered to different zones of the aircraft 10, i.e., the flight deck 128 and the cabin 134.

Based on the position of the cross-bleed valve 18, the air system 100 can operate in a 2S2P (two sources and two PACKS) mode, 1S1P (one source and one PACK) mode, 2S1P (two sources and one PACK) mode or a 1S2P (one source and two PACKs). When operating in the 2S2P mode, the left portion 80 supplies pre-cooled air 109 to left PACK 114, while the right portion 90 supplies pre-cooled air 109 to the right PACK 130 and the cross-bleed valve 18 is closed. When operating in the 1S1P mode (one source and one PACK; e.g., during an ECS fault event), pre-cooled air 109 from either the left portion 80 or the right portion 90 is delivered to either the left PACK 114 or the right PACK 130 and the cross-bleed valve 18 is open or closed accordingly. When operating in the 2S1P mode (two sources and one PACK; e.g., during an ECS fault event), pre-cooled air 109 from both the left portion 80 and the right portion 90 is delivered to either the left PACK 114 or the right PACK 130 and the cross-bleed valve 18 is open. When operating in the 1S2P mode (one source and two PACKs; e.g., during an ECS fault event), pre-cooled air 109 from either the left portion 80 or the right portion 90 is delivered to both the left PACK 114 and the right PACK 130 and the cross-bleed valve 18 is open.

The pre-cooler 115 operates according to either heated high-pressure bleed air 101 or low-pressure bleed air 103. For instance, a high-pressure bleed air network 102 ducting receives the high-pressure bleed air 101 from a high-pressure port bleed source (HPPB) 55, and a low-pressure bleed air network 104 ducting receives the low-pressure bleed air 103 from a low pressure port bleed source (LPPB) 57. An output channel 160 commonly connects the output of the high-pressure bleed air network 102 ducting and the output of the low-pressure bleed air network 104 ducting.

The high-pressure bleed air network 102 ducting further includes a HPSOV 110. The HPSOV 110 selectively controls the output of the high-pressure bleed air network 102 ducting and the output of the low-pressure bleed air network 104 ducting. When the aircraft 10 is operating at low-engine power, the HPSOV 110 can be opened such that the high-pressure bleed air 101 is delivered through the airflow network 100. Once the HPSOV 110 is opened, a check valve 111 installed in the low-pressure bleed air network 104 ducting is forced closed, thereby blocking the low-pressure bleed air 103 from flowing through the airflow network 100. When, however, the aircraft 10 is operating at high-power conditions, the HPSOV 110 can be closed which in turn opens the check valve 111 to supply low-pressure bleed air 103. Accordingly, the low-pressure bleed air 103 flows through the airflow network 100.

The HPSOV 110 is typically located in an engine environment, which is hot, dirty and exposed to constant vibrations. Although the HPSOV 110 has no feedback sensors or position sensors (RVT, potentiometer, limit switches), a HPPB pressure sensor 121 is provided, which detects the pressure at the inlet of the HPSOV 110. The body and internal components of the HPPB pressure sensor 121 is mounted remotely from the engine environment, but it includes a receptor (e.g., tube) that is coupled to the HPPB 55. In this manner, the HPPB pressure sensor 121 can detect the inlet pressure without being directly exposed to high engine temperatures or vibrations.

The airflow system 100 also includes a ram air system 108. The ram air system 108 generates cool air 105 (also known as a cold sink system) which can be used to cool the bleed air 101 or 103 delivered to the precooler 115. Heat from the high-pressure bleed air 101 or low-pressure bleed air 103 is then exchanged with the cool air 105. During the cooling process, cool air 105 is converted into heated ram air 107. This heated ram air 107 is discharged into the atmosphere via an overboard port 112 so that it is prevented from entering the cabin. In at least one embodiment, the ram air 105, 107 does not physically mix with the bleed air 106, 109; rather heat is exchanged only.

The pre-cooled air output 109 from the precooler 115 can be regulated using a throttling valve such as a pressure regulating shutoff valve (PRSOV) 116, for example, while the PACKS 114 and 130 are capable of measuring and controlling the mass flow of air. Accordingly, the mass flow rate of either the high-pressure bleed air 101 or the low-pressure bleed air 103 is known The pressure measurement from sensor 118 allow the ECS 50 to regulate the bleed manifold pressure using the PRSOV 116, while using the ram air control valve 117 and the bleed manifold temperature sensor 120 to regulate the bleed manifold temperature. It should be appreciated that the bleed manifold pressure sensor 118 and/or bleed manifold temperature sensor 120 can be located at different locations than illustrated in FIG. 2 without departing from the scope of the invention.

The PRSOV 116 can regulate bleed manifold pressure to a fixed constant value such (e.g., as 35 PSIG), while the inlet pressure to PRSOV 116 is greater than the fixed pressure value. The fixed pressure value can therefore be used as target or reference pressure value ($P_{Ref}$). In at least one embodiment, the PRSOV 116 outlet pressure is approximately 35 PSIG, regardless of whether high-pressure bleed air 101 or low-pressure bleed air 103 is used. A valve position sensor such as a rotary variable transformer (RVT) 125, for example, is also provided, which can measure the current position of the PRSOV 116. In this manner, the ECS controller 150 can execute a nested feedback control loop to modulate bleed manifold pressure using the PRSOV 116. For example, an outer loop provides a subtracted measured feedback of the pressure $P_{FB}$ from the reference pressure $P_{Ref}$ and then subjects the error to a proportional and integral compensation. The output of the outer loop is then a PRSOV position reference $Pos_{Ref}$. This PRSOV position command $Pos_{Ref}$ becomes the reference or target value for an inner loop on position. The inner loop subtracts measured feedback of the position $Pos_{FB}$ of the PRSOV 116 from the reference $Pos_{Ref}$ and then subjects the error to a proportional and integral compensation. The output of the inner loop is then a PRSOV position command $Pos_{Cmd}$. Accordingly, the ECS controller 150 can continuously adjust the PRSOV 116 until the value of the feedback pressure signal ($P_{FB}$) output by pressure sensor 118 reaches the target pressure value ($P_{Ref}$); e.g., 35 PSIG).

The PRSOV 116 has a predefined relationship between valve position and the valve's effective area. That is, the actual effective area of the PRSOV 116 is defined as a function of the valve's position. This relationship between valve position and effective area is defined by the design of the PRSOV 116. Therefore, because the PRSOV position is known (i.e., measured by the RVT 125), the effective area of the PRSOV 116 is also effectively known.

Assuming further, for example, that the HPPB 55 is selected (i.e., to deliver high-pressure bleed air 101 to the precooler 115), the HPSOV 110 should be open and the PRSOV inlet pressure can be determined by setting it equal to the HPPB 55 pressure signal 156. The output of the HPPB pressure sensor 121 is read and processed by FADEC (Full Authority Digital Engine Control) 155, and then transmitted to ECS Controller 150 as HPPB Pressure signal value 156 via a serial data bus. Setting the PRSOV inlet pressure equal to the HPPB ignores the pressure drops in between. If greater accuracy is desired, the ECS 50 pressure drops can be quantified by while taking into account mass flow measured by the PACK 114 (i.e., the MAF 113).

The equations described below are utilized by the ECS controller 150 to perform a BIT of the HPSOV 110, without requiring position feedback or implementing an additional valve position sensor associated with the HPSOV 110.

$$PR_{CRIT} = \left(\frac{2}{k+1}\right)^{\frac{k}{k-1}} \quad \text{Eq. 1}$$

$$PR = \max\left(\frac{P_d}{P_u}, PR_{CRIT}\right) \quad \text{Eq. 2}$$

$$w_c = \sqrt{\frac{[PR^{\frac{2}{k}} - PR^{\frac{(k+1)}{k}}] \cdot 2 \cdot G \cdot k}{R \cdot [k-1]}} \quad \text{Eq. 3}$$

-continued $$w = w_c \cdot \frac{Ae \cdot P_u}{\sqrt{T}} \quad \text{Eq. 4}$$

$$Ae = \frac{w\sqrt{T}}{w_c \cdot P_u} \quad \text{Eq. 5}$$

In equations 1, and 2 listed above, Pd is the PRSOV downstream pressure in pounds per square inch absolute (PSIA) as measured by pressure sensor 118. The value Pu is equal to the PRSOV 116 upstream pressure in pounds per square inch absolute (PSIA). In at least one embodiment, Pu is approximately equal to engine compressor pressure P3 as measured by pressure sensor 121 (HPPB pressure sensor value 156). However, there is a pressure drop between HPPB pressure and PRSOV inlet pressure and hence a slight source of error. The algorithm's effective area tolerance described below can be adjusted to accommodate the error. The pressure drop can also be estimated based on the mass flow measured by the PACK 114 (i.e., the MAF 113) if one knew the temperature of the HPPB air or can be a correction as a function of ambient temperature, ambient pressure and mass flow. In this manner, Pu can be measured by sensor 121, and in turn utilized to effectively determine (e.g., approximate) the pressure existing at the inlet of the PRSOV 116. As a result, an additional pressure sensor is not required at the inlet of the PRSOV 116, thereby reducing components and costs of the system.

The value PR represents a maximum value of the ratio between the PRSOV downstream pressure and the PRSOV upstream pressure (Pd/Pu), and PRcrit which is the critical pressure ratio corresponding to choked flow. For air, PRcrit is equal to 0.528. The value k is the ratio of specific heats at constant pressure and constant volume. For air, k=1.4. The value G is the constant for acceleration, which is equal to 386.4 lbm-in/(lbf-sec$^2$). The value R is the ideal gas constant, which is equal to 640 lbf-in/(lbm-degrees Rankine).

Once PR is determined, the corrected mass flow rate $w_c$ is calculated using Equation 3. The value $w_c$ is a corrected mass flow rate, which is corrected for temperature, pressure and effective area.

Turning to Equations 4 and 5 in particular, the value w is the actual mass flow rate measured by the MAF sensor 113. The value T is the absolute temperature in degrees Rankine. For a throttling valve such as the PRSOV 116, the PRSOV outlet temperature is approximately equal to the PRSOV inlet temperature because a throttling valve such as PRSOV 116 has insignificant effect on temperature. That is, a throttling process has no heat loss or gained and no work is performed. Hence, a throttling process has no change in enthalpy of the air through the throttling device (PRSOV 116) and the temperature remains constant. Such a thermodynamic process is termed isenthalpic. The temperature downstream of the PRSOV 116 is measured by temperature sensor 120. The value (Ae) represents the calculated effective area of a valve (e.g., the PRSOV 116) measured in square inches. In one non-limiting embodiment, the effective area is the actual valve area multiplied by an empirically derived correction factor for a valve (e.g., 0.98).

Equation 5 is simply equation 4 solved for effective area ($A_e$). Using the known values for w, T, $w_c$ and $P_u$, described above, the value of effective area ($A_e$) is calculated.

The aforementioned equations are preferably applied an ECS operating in steady-state. It should be appreciated, that the equations can be modified to account for an ECS operating in a dynamic state without deviating from the scope of the invention.

Keeping in mind that the ECS controller assumes that the HPSOV 110 is commanded to be in a fully open position, the ECS can then perform various BIT procedures to diagnose the operation of the HPSOV. According to one test, when a difference between the calculated effective area (Ae) of the PRSOV 116 per Equation 5 and the primary effective area ($Ae_{POS}$) based on PRSOV position feedback is within a threshold range, then the ECS controller's assumption is correct, i.e., the HPSOV 110 is presently in a fully open position. When, however, the difference falls outside the threshold range, then the ECS controller 150 determines that the initial assumption was incorrect, and that the HPSOV 110 has failed closed, i.e., has failed to open.

According to another test, the ECS controller 150 assumes that the HPSOV 110 is fully open, but also determines whether the HPSOV 110 was in fact commanded to be fully closed. In this scenario, when HSPOV 110 is in fact commanded to be closed, but the difference between the calculated effective area (Ae) of the PRSOV 116 and the primary effective area ($Ae_{POS}$) is within a threshold range, then the ECS controller 150 determines that the HPSOV 110 is improperly opened such that faulty HPSOV 110 is present.

In at least one embodiment, the ECS controller 150 can determine an effective area of the PRSOV 116 based on the measured position output by the RVT 125, and can then diagnose the operation of the HPSOV 110 based on the PRSOV's effective area, without actually measuring the position of the HPSOV 110. For instance, the ECS controller 150 initially presumes that the HPSOV 110 is open such that the high-pressure bleed air 102 should be delivered to the through the HPSOV, through the PRSOV, and to the PACK 114.

The ECS controller 150 then determines a difference between a calculated effective area (Ae) of the PRSOV 116 using equations 1-5 described above, and a primary effective area ($Ae_{POS}$) of the PRSOV 116 which is determined as a function of the PRSOV's position as measured by the RVT 125. The primary effective area ($Ae_{POS}$) can be determined, for example, using a schedule. As described herein, a schedule is a mathematical function where one or more input variables are used to determine an output based on linear interpolation between discrete points or a lookup table. The schedules are stored in the memory of the ECS controller 150. The schedule cross-references predetermined (e.g., stored) position values corresponding to the plurality of positions of the PRSOV 116, with a respective predetermined effective area value. These predetermined effective area values are dictated by the physical design of the PRSOV 116, and are therefore known. Accordingly, the ECS controller 150 can determine the primary effective ($Ae_{POS}$) based on the measured valve position.

In at least one embodiment, it is assumed that the PRSOV 116 is validated for fault-free operation using a BIT. Accordingly, another BIT executed by the ECS controller includes driving the PRSOV 116 to a fully open position and comparing the measured position to the expected value for the fully open position. The ECS controller 150 then drives the PRSOV 116 to the fully closed position, and compares the measured position to the expected value for fully closed position.

According to another non-limiting embodiment, the ECS controller can estimate the error caused by the pressure drop between measurement of the pressure sensor 118 and the pressure at the inlet of the PRSOV 116. Accordingly, the pressure drop can be empirically correlated with the pressure measured at the inlet of the HPSOV per the HPPB pressure signal 156, ambient temperature, ambient pressure and/or the actual mass flow measured by the MAF sensor 113. In the alternative, the HPPB temperature can be measured and an analytic prediction of the pressure drop can be calculated. Using either of these two refinements, the algorithm's effective area tolerance can be minimized.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft environmental control system (ECS) comprising:
    a first valve that is adjustable between a plurality of first positions to open or shut-off a bleed air flow that flows from an inlet of the first valve to an outlet of the first valve;
    a second valve including an inlet of the second valve in fluid communication with the outlet of the first valve, the second valve adjustable between a plurality of second positions to throttle the bleed air that flows from the inlet of the second valve to an outlet of the second valve;
    a valve position sensor coupled to the second valve and configured to output a position signal indicative of a measured position among the plurality of second positions; and
    an electronic hardware controller in signal communication with the valve position sensor, the controller configured to determine a primary effective area of the second valve based on the measured position, and to diagnose operation of the first valve based on the primary effective area.

2. The aircraft ECS of claim 1, wherein the first valve excludes a valve position sensor.

3. The aircraft ECS of claim 2, wherein the controller diagnoses the operation of the first valve based on a comparison between the primary effective area and a calculated effective area of the second valve.

4. The aircraft ECS of claim 3, wherein the controller determines a difference between the calculated effective area and the primary effective area, while assuming that the first valve is adjusted in an open position.

5. The aircraft ECS of claim 4, wherein the controller determines the first valve is correctly assumed as being in the open position when a difference between the calculated effective area and the primary effective area is within a threshold range, and determines the first valve is not in the open position when the difference is outside the threshold range.

6. The aircraft ECS of claim 4, further comprising:
a bleed air source that delivers the bleed air flow to the inlet of the first valve;
a pressure sensor in signal communication with the controller, and configured to output a pressure signal approximately indicative of the Pu;
a temperature sensor in signal communication with the controller, and configured to output a temperature signal indicative of the T;
a pneumatic load in fluid communication with the outlet of the second valve, the load including a mass air flow (MAF) sensor in signal communication with the controller and configured to output a MAF signal indicative of the w.

7. The aircraft ECS of claim 3, wherein the primary effective area is based on predetermined position values stored in the memory of the electronic hardware controller corresponding to the plurality of second positions with a respective predetermined effective area value of the second valve, and wherein the calculated effective area (Ae) is calculated according to the equation:

$$Ae = \frac{w\sqrt{T}}{w_c \cdot P_u},$$

where w is a mass air flow of the bleed air flow, T is a temperature at the second valve inlet and the second valve outlet, $w_c$ is the corrected mass air flow value that is corrected for pressure, temperature and valve effective area, and $P_u$ is a pressure existing upstream of the inlet of the second valve.

8. A method of diagnosing a valve included in an environment control system (ECS) of an aircraft, the method comprising:
supplying bleed air flow to a first valve that is adjustable between a plurality of first positions to open or shut-off the bleed air flow flowing from an inlet of the first valve to an outlet of the first valve;
outputting, via a valve position sensor, a position signal indicating a measured position of a second valve including an inlet of the second valve in fluid communication with the first valve outlet, the second valve adjustable between a plurality of second positions to throttle the bleed air that flows from the inlet of the second valve to an outlet of the second valve;
determining, via an electronic hardware controller, a primary effective area of the second valve based on the measured position; and
diagnosing, via the controller, an operation of the first valve based on the primary effective area.

9. The method of claim 8, wherein diagnosing the operation of the first valve is performed without measuring a position of the first valve.

10. The method of claim 9, wherein diagnosing the operation of the first valve is based on a comparison between the primary effective area and a calculated effective area of the second valve.

11. The method of claim 10, wherein diagnosing the operation of the first valve further comprises:
assuming the first valve is adjusted into an open position; and
determining a difference between the calculated effective area and the primary effective area.

12. The method of claim 11, wherein the controller determines the first valve is correctly assumed as being in the open position when a difference between the calculated effective area and the primary effective area is within a threshold range, and determines the first valve is not in the open position when the difference is outside the threshold range.

13. The method of claim 12, wherein diagnosing the operation of the first valve further comprises:
determining, via the controller, a plurality of position values, each position value corresponding to a respective adjustable position of the second valve, and each position value corresponding to an actual effective area of the second valve; and
comparing, via the controller, the second valve's measured position to the plurality of position values to determine the actual effective area.

14. The method of claim 13, wherein diagnosing the operation of the first valve further comprises:
delivering, via a bleed air source, the bleed air flow to the inlet of the first valve;
generating, via a pressure sensor in signal communication with the controller, a pressure signal indicative of a pressure (Pu) existing upstream from the inlet of the second valve;
generating, via a temperature sensor in signal communication with the controller, a temperature signal indicative of a temperature (T) at the inlet of the second valve and the outlet of the second valve;
generating, via a mass air flow (MAF) sensor in signal communication with the controller, a MAF signal indicative of a mass air flow (w) of the bleed air flow; and
determining the calculated effective area (Ae) based on the Pu, T, and w.

15. The method of claim 14, wherein the calculated effective area (Ae) is calculated according to the equation:

$$Ae = \frac{w\sqrt{T}}{w_c \cdot P_u},$$

where $w_c$ is a corrected mass air flow value that is corrected for pressure, temperature and valve effective area, and $P_u$ is a pressure existing upstream from the inlet of the second valve.

* * * * *